Oct. 18, 1966  E. L. WEIMER  3,279,117

MAGNETICALLY ACTUATED FISHING LURE OF PLUG TYPE

Filed Nov. 18, 1964

INVENTOR.
EMORY L. WEIMER
BY Fred C. Matheny
ATTORNEY

United States Patent Office 3,279,117
Patented Oct. 18, 1966

3,279,117
MAGNETICALLY ACTUATED FISHING LURE
OF PLUG TYPE
Emory L. Weimer, Orondo, Wash.
Filed Nov. 18, 1964, Ser. No. 412,199
5 Claims. (Cl. 43—42.03)

My invention relates to a magnetically actuated fishing lure of plug type and is in the nature of an improvement on the magnetically actuated fishing plug described in my prior copending patent application Ser. No. 326,686.

An object of this invention is to provide a magnetically actuated lure comprising a plug body having a water reaction member of approximately U-shape fitting over and straddling and pivotally mounted on its forward or leading end portion and further having permanent magnet means positioned and arranged so as to exert magnetic forces tending to move and releasably hold the plug body and water reaction member in either of two different angular positions relative to each other, said water reaction member and plug member being adapted to be relatively moved between their two different angular positions by water pressure and the pull of a fish line when the lure is in use and the magnetic forces, which are applied simultaneously with the water pressure and pull of the fish line, tending to impart quick and snappy and somewhat erratic movement to the lure as the two parts thereof move from one angular position to the other.

Other objects of my invention will be apparent from the following description taken in connection with the accompanying drawings.

Like reference numerals refer to like parts throughout the several views.

Figure 1:
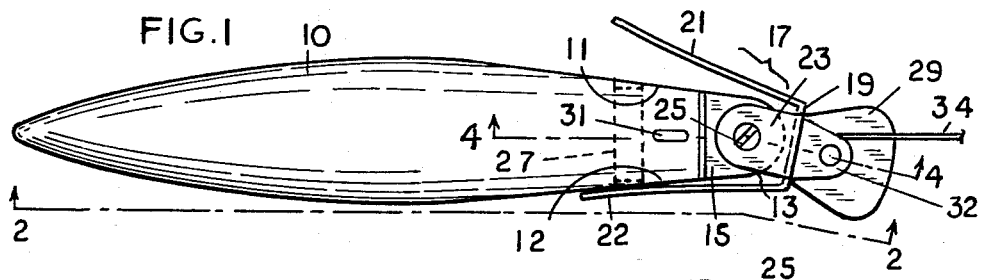
FIGURE 1 is a top plan view of a fishing lure or plug made in accordance with my invention.
Figure 2:
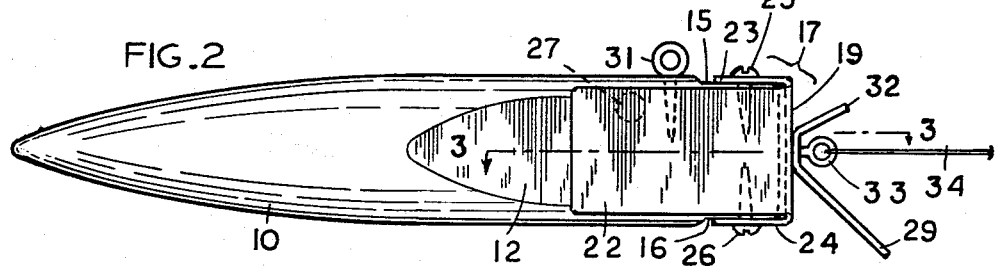
FIG. 2 is a side elevational view of the same looking in the direction indicated by broken line 2—2 of FIG. 1.

The form of invention disclosed in FIGS. 1 to 4 comprises a plug body 10 which is of substantially conventional shape except that the forward end portion thereof, from a point about midway of the length of the plug body, is symmetrically tapered in such a manner as to provide two flat sides 11 and 12 which terminate in a narrowed forward end portion 13. The end portion 13 is preferably but not essentially of rounded cross section. The top and bottom sides of said plug body 10 are provided with shallow notches 15 and 16 respectively, which extend rearwardly a short distance from the forward end 13 and facilitate attachment to the plug body of a water reaction member indicated in a general way by numeral 17. Preferably the water reaction member 17 is formed of thin sheet metal capable of being attracted by a magnet and having a bright and light reflective surface, said member 17 being bent to the shape herein shown and described.

Said water reaction member 17 comprises a front plate 19, herein disclosed as flat but which may be curved, and two approximately flat divergent side plates or vanes 21 and 22 integral with or rigidly attached to the lateral edge portions of said front plate 19 and extending rearwardly therefrom in diverging relation to each other along the respective flat sides 11 and 12 of the plug member 10. Two flat mounting lugs 23 and 24 are rigid with and extend rearwardly from the respective top and bottom edges of the said front plate 19 and are positioned in the respective notches 15 and 16 when the plug body 10 and member 17 are in assembled relation. Pivot means, herein disclosed as screws 25 and 26 but which may be a pin or pins, extend through the respective lugs 23 and 24 and are threaded into the forward end portion of the plug body 10 and pivotally connect the water reaction member 17 with the plug body 10.

The flat side plates 21 and 22 straddle the forward end portion of the plug body and are divergently spread apart far enough to allow the water reaction member 17 to swingingly move through a limited angle relative to the plug body. I find that the lure will operate satisfactorily if relative angular movement in the order of fifteen degrees is provided for but it will be understood that the amount of angular movement thus provided for may be substantially varied.

A permanent magnet 27 is imbedded in and extends crosswise of the plug body 10 between the rear end portions of the two side plates 21 and 22. Preferably each end of the magnet 27 terminates slightly below the plane of the adjacent plug face 11 or 12 so that when one of the plates 21 or 22, which are of magnetic material, lies against a flat surface 11 or 12 of the plug body 10 it will be close to but not in actual contact with the adjacent end of the magnet 27. The magnet 27 will hold one of the plate members 21 or 22 against the adjacent side of the plug body 10 until the water pressure on the other plate member and the pull exerted by a fish line 34 overcome the force of the magnet and cause the member 17 to change its angular position relative to the plug body 10, as hereinafter described.

A downwardly and forwardly extending water reaction vane 29 is rigidly secured to the front wall 19 of the member 17. When the lure is drawn through the water or is subjected to the action of flowing water the pressure of the water against this inclined vane 29 will tend to depress the lure to a greater depth in the water. Water pressure on this inclined vane 29 will also tend to influence, to some extent, the lure in the water and will have some influence on the pivotal action of the water reaction member 17 relative to the plug body 10.

Preferably three line attachment eye members 31, 32 and 33 are connected, at different elevations, with the forward end portion of the lure and a fishing line 34 can be attached to any chosen one of these eye members. The eye members 31 and 33 herein disclosed are screw-eyes threaded into the forward end portion of the plug body 10. The eye member 31 extends upwardly from the plug body 10. The eye member 33 extends forwardly from said plug body 10 through a fairly large clearance opening 35 in the front plate 19 and base portion of the inclined vane 29. The eye member 32 is herein disclosed as being an inclined perforated lug which is integral with the base portion of the vane 29. The two eye members 31 and 33 provide for connecting the fish line 34 directly with the plug body 10 at two different locations to obtain different action of the lure in the water. The eye member 32 provides for connecting the fish line directly with the water reaction member 17 at a third location and this further modifies and changes the action of the lure in the water.

Figure 3:
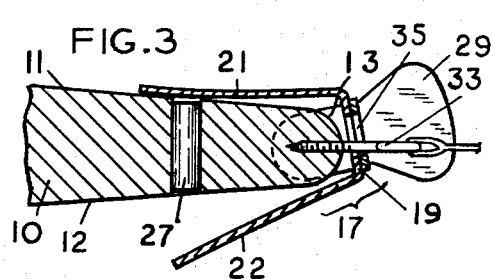
FIG. 3 is a fragmentary sectional view, with parts in plan, taken substantially on broken line 3—3 of FIG. 2.
Figure 4:
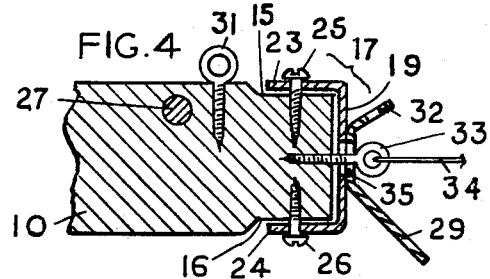
FIG. 4 is a fragmentary sectional view, with parts in elevation taken substantially on broken line 4—4 of FIG. 1.

When the just described lure is not in use or when there is no movement of said lure relative to water in which it is being used the attraction of the magnet 27 for the plate 21 or 22 closest to it will lightly hold the water reaction member 17 and plug body 10 in either the angular position in which they are shown in FIG. 1 or in which they are shown in FIG. 3. If, for instance, member 17 and plug body 10 are in the relative angular position shown in FIG. 1 and the lure is trolled through water by the line 34 water pressure will be exerted on the outer side of the plate 21, which will be at a substantial angle to the direction of movement of the lure and direction of pull of line 34. The pressure thus exerted against the outer surface of plate 21 will tend to deflect the lure sidewise in the direction toward which the pressure is exerted and as the lure is deflected sidewise the water pressure against the plate 21 will increase to a sufficient extent to overcome the pull of the magnet on the plate 22 and start relative angular movement of the member 17 and the plug body 10 toward the position in which they are shown in FIG. 3. As soon as plate 22 breaks away from magnet 27 the combined water pressure and pull exerted by said magnet 27 on plate 21 will ordinarily impart a quick and snappy motion to the parts 17 and 10 in completing their movement to the position in which they are shown in FIG. 3. The operation in moving from the angular position shown in FIG. 3 to the angular position shown in FIG. 1 will be similar. Thus the lure will move from side to side and a quick and snappy and somewhat erratic movement, due primarily to the action of the magnet and which is alluring to fish, will be imparted to the parts of said lure each time they move from one angular position to the other.

Figure 5:
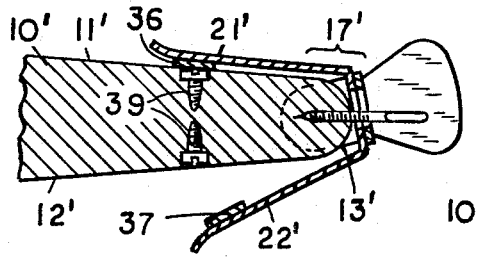
FIG. 5 is a fragmentary sectional view similar to FIG. 3 and with parts in plan, showing a modified form of the invention.

In the embodiment of my invention disclosed in FIG. 5 the arrangement of the permanent magnet and armature means is reversed, in an obvious manner, by attaching small permanent magnets 36 and 37 to the respective flat side plates 21' and 22' of a water reaction member 17' and imbedding one or more parts of magnetic material, such as screws 39 of ferrous metal, in a plug body 10' with their heads approximately flush with flat lateral sides 11' and 12' of said plug body and with screws 39 positioned so that they register with the magnets 36 and 37 respectively. Except for this reversal of magnet parts and a slight spreading apart of the flat side plates 21' and 22' to compensate for the added thickness of the magnets 36 and 37 the plug body 10' and water reaction member 17' are the same as the previously described plug body 10 and water reaction member 17. The lure shown in FIG. 5 operates in substantially the same manner as the lure shown in FIGS. 1 to 4.

Figure 6:
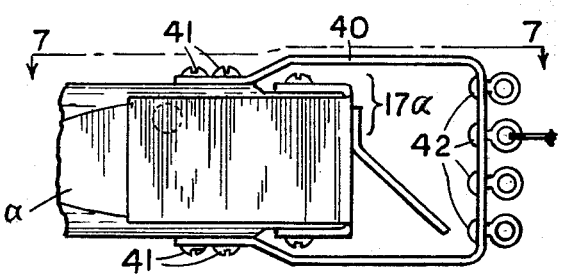
FIG. 6 is a fragmentary side elevation showing the forward end portion of a trolling plug having line attachment means of modified form.
Figure 7:
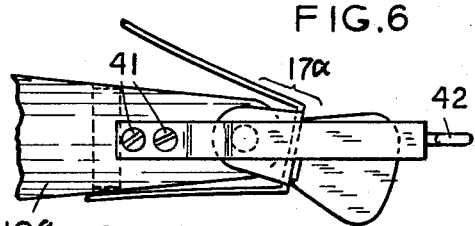
FIG. 7 is a top plan view taken substantially on broken line 7—7 of FIG. 6.

FIGS. 6 and 7 disclose an embodiment of my invention in which the line attachment eye members 31, 32 and 33 are omitted and a line attachment bale or bracket 40 of approximately U-shape is rigidly secured by screws 41 to the forward end portion of a plug member 10a and extends forwardly therefrom. Except for the difference in line attachment means the plug member 10a and water reaction member 17a are the same as the plug member 10 and water reaction member 17 shown in FIGS. 1 to 4. A plurality of spaced apart line attachment eye members 42 are secured to the forward end portion of the bracket 40 and provide means whereby the point of connection of a fish line can be adjusted relative to the lure. Preferably the connections of eye members 42 with bracket 40 are of swivel type. The line attachment bracket 40 is positioned in a plane which coincides in a general way with the pivotal axis connecting members 10a and 17a and said bracket member serves as a weed guard and shield for the water reaction member 17a.

The foregoing description and accompanying drawings disclose preferred embodiments of my invention but it will be understood that changes may be made within the scope of the following claims.

I claim:
1. In a fishing lure, a plug body of generally elliptical shape having a forward end portion provided with two convergent lateral sides; a U-shaped water reaction member of thin flat metal material of substantial width extending over and straddling the forward end portion of said plug body, said water reaction member having flat divergent side plates which are spaced apart a distance greater than the width of the part of the plug body they straddle; pivot means connecting said water reaction member and the forward end portion of said plug body providing for relative pivotal movement of each side plate toward and away from the adjacent convergent side of the plug body; and permanent magnet means operatively connected with the plug body and water reaction member adapted to lightly and releasably hold either side plate against the adjacent side of the plug body.

2. A plug type fishing lure comprising a plug body convergently tapered symmetrically on two opposite sides from a location a substantial distance rearwardly of its forward end to said forward end; a water reaction member of approximately U-shape in longitudinal cross section having a front portion positioned adjacent to and extending across the front end of the plug body and having two approximately flat metal side plates of substantial width extending rearwardly in divergent relation from the respective lateral edges of said front portion and forming water reaction vanes extending along the opposed convergent sides of the plug body, the spacing of said side plates being greater than the thickness of the adjacent convergent portion of said plug providing for limited angular movement between the water reaction member and the plug body; pivot means pivotally connecting said water reaction member with the forward end portion of said plug body for swinging movement about an axis positioned between and substantially parallel to said two side plates; and permanent magnet means operatively connected with the plug body and water reaction member capable of yieldingly holding either of said side plates against the adjacent side of said plug body while yieldingly maintaining the other side plate at a divergent angle relative to the side of said plug body adjacent said other side plate.

3. The apparatus as claimed in claim 2 in which the water reaction member is formed of thin flat magnetic metal having a light reflective outer surface, and in which said magnet means comprises a permanent magnet imbedded in said plug body and extending transversely across the plug body approximately from side to side thereof between the rear end portions of said side plates.

4. The apparatus as claimed in claim 2 in which two mounting lugs are rigid with the respective upper and lower edges of the front portion of said water reaction member and extend rearwardly therefrom over the forward end portion of said plug body and in which the pivot means pivotally connects said mounting lugs with said plug body.

5. The apparatus as claimed in claim 2 in which an inclined water reaction vane is rigid with the front portion of the water reaction member and extends forwardly therefrom.

References Cited by the Examiner
UNITED STATES PATENTS 2,565,099   8/1951   Simmons _____ 43—42.03
3,196,574   7/1965   Weimer _____ 43—42.03

SAMUEL KOREN, *Primary Examiner.*
D. J. LEACH, *Assistant Examiner.*